United States Patent
Ballato et al.

[11] Patent Number: 5,847,435
[45] Date of Patent: Dec. 8, 1998

[54] DYNAMIC MODULATION OF QUANTUM DEVICES

[75] Inventors: Arthur Ballato, Oceanport; Richard H. Wittstruck, Howell; Yicheng Lu, East Brunswick, all of N.J.; Mitra Dutta, Silver Spring, Md.; Jagadeesh Pamulapati, Eatontown, N.J.; Paul H. Shen, North Potomac, Md.

[73] Assignee: The United States of America as represented by the Secretary of the Army, Washington, D.C.

[21] Appl. No.: 695,055

[22] Filed: Aug. 9, 1996

Related U.S. Application Data

[63] Continuation-in-part of Ser. No. 388,100, Feb. 14, 1995, abandoned.

[51] Int. Cl.$^6$ .............................. H01L 29/82; H01L 29/06
[52] U.S. Cl. ................... 257/417; 257/13; 257/17
[58] Field of Search .................................. 257/13, 17, 417

[56] References Cited

U.S. PATENT DOCUMENTS

| | | |
|---|---|---|
| 5,101,294 | 3/1992 | Jain et al. . |
| 5,159,420 | 10/1992 | Grudkowski et al. . |
| 5,220,163 | 6/1993 | Toughlian et al. . |
| 5,274,247 | 12/1993 | Dutta et al. . |
| 5,283,444 | 2/1994 | Sacks et al. . |

OTHER PUBLICATIONS

Miller, D.A.B. et al, Physics Review, 1985, B32, p. 104.

Primary Examiner—Valencie Martin Wallace
Attorney, Agent, or Firm—Michael Zelenka

[57] ABSTRACT

An MQW is fabricated such that at a particular level of purely mechanical stress/strain the optical properties of the MQW are altered by breaking the heavy and light hole degeneracy (splitting of the heavy and light holes in the valence band) of the MQW in the E-k domain. In a preferred embodiment of the invention ring electrical contacts are disposed on the MQW and the entire MQW structure, including electrical contacts is mounted on a piezoelectric substrate, with the proper crystallographic orientation and strain induced orientation, via an epoxy.

In operation, a bias is applied to the MQW structure and the piezoelectric substrate. The bias causes quantum decoupling of the heavy and light holes; however, the bias also will cause the piezoelectric material to move, which will induce a strain on the MQW structure. This strain will, in turn, also induce a decoupling of the heavy and light holes, but to a greater degree than the decoupling induced by the electrical bias and therefore, the absorption of the MQW will altered, thereby polarizing optical signal incident to (or through) the device.

22 Claims, 2 Drawing Sheets

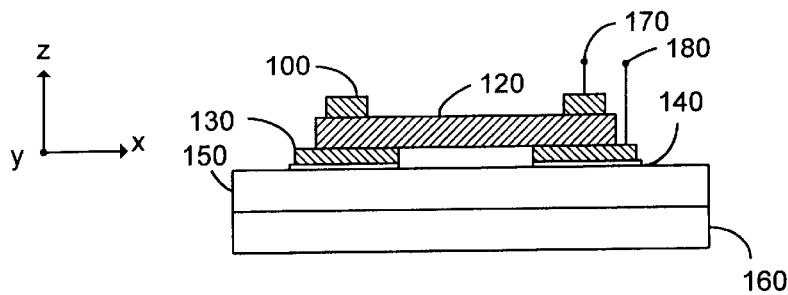
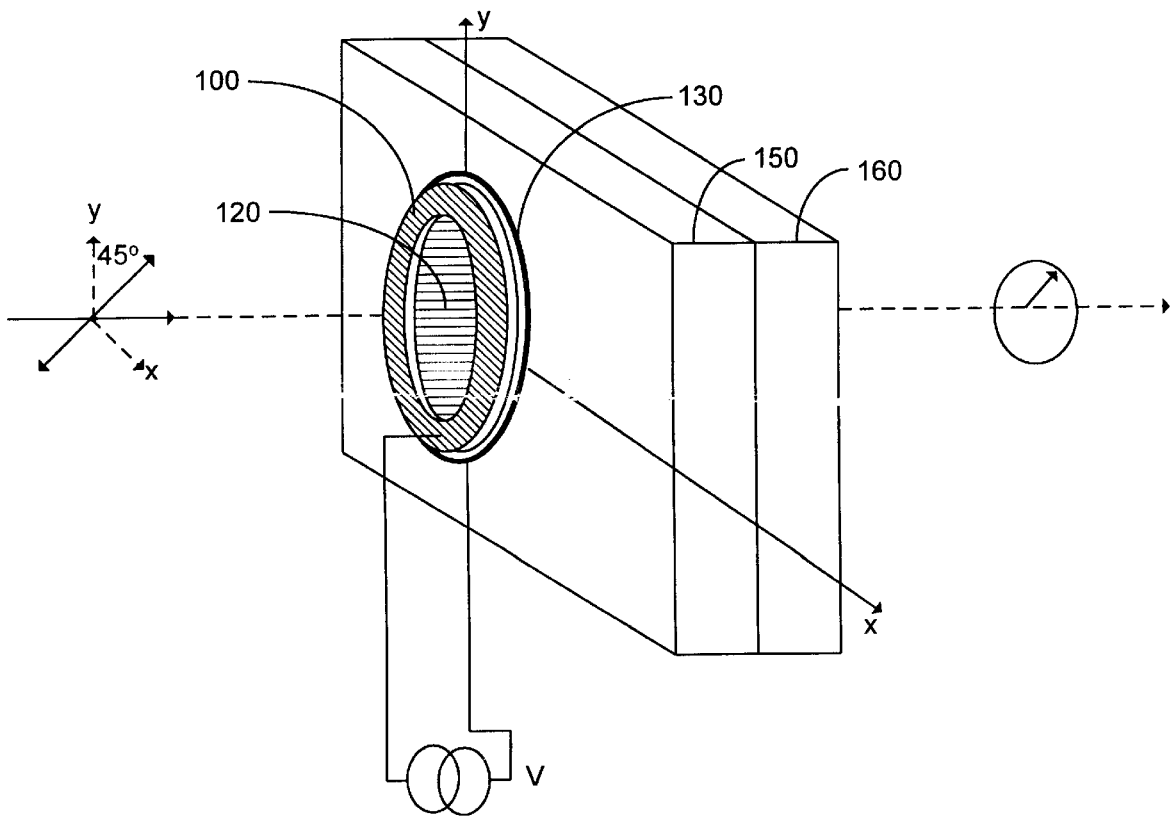

DYNAMIC MODULATION OF QUANTUM DEVICES

CONTINUATION IN PART

This patent application is a Continuation in Part of U.S. patent application Ser. No. 08/388,100, filed by the same inventors listed herein on Feb. 14, 1995, now abandoned, and having Attorney Docket number CECOM-5065. Priority of this Parent Patent Application is claimed.

GOVERNMENT INTEREST

The invention described herein may be manufactured, used, and licensed by or for the Government of the United States of America without the payment to us of any royalty thereon.

FIELD OF THE INVENTION

This invention relates in general to quantum devices and more particularly to quantum devices which can be dynamically modulated at room temperature by the controlled application of a vibrational strain via an applied voltage or current of variable frequency. Included are such devices as electro-optic semiconductor heterostructures suitable for use as high-contrast, fast-switching optical modulators for use in real-time pattern recognition, and associated applications.

BACKGROUND OF THE INVENTION

It is known in the art that spatial light modulators (SLMs) have used either polarization or absorption of light to modulate optic signals. Heretofore, state-of-the-art optic modulators have used either polarization of light, such as in nematic liquid crystal devices, or absorption of light, such as in devices based on the Quantum Confined Stark Effect (QCSE), to modulate optic signals. These devices, however, resulted in either high contrast (10000:1) and low speed (1 msec–1 usec), liquid crystal devices, or high speed (100 psec–10 msec) and low contrast (100:1), QCSE devices.

As is well known, nematic liquid crystal devices are generally composed of two glass plates with conductive coatings on their inner surfaces and liquid crystal being sandwiched between them. When subjected to an electric field by the conductive coatings, the liquid crystal becomes opaque and reflective thus modulating any light incident to the device.

QCSE devices, in contrast to liquid crystal devices, utilize quantum well superlattice heterostructures and the application of an electric field to vary the absorption resonance of the heterostructure which, in turn, modulates optic signals. The principles behind the QCSE have been more fully explained by D. A. B. Miller et al, in Physics Review, 1985, B32, pg. 1043. Briefly though, in a quantum well at zero electric field, the electron and hole energy levels of the heterostructure are defined by the well width, and generally it is preferred that the electrons and holes are strongly confined in the well layer. When an electric field is applied, the electrons and holes are moved apart and their energies altered. This has the effect of shifting the absorption resonance to lower energy as well as modulating the strength of the absorption. This occurs because direct optical absorption of a photon above the band gap energy involves raising an electron from one of the valence bands and putting it in the conduction band. This is otherwise known as formation of an electron-hole pair. This shift in the absorption resonance, then, provides for the optical modulation of any radiation that is incident to the heterostructure.

As indicated above, the devices based on the QCSE have high speed and poor contrast while liquid crystal devices have low speed and high contrast. Known heterostructure devices use a substrate material having a fixed, preselected strain. On such device is disclosed in U.S. Pat. No. 5,274,247, issued to Dutta et al on Dec. 28, 1993. This U.S. Patent, which is incorporated herein by reference hereto, discloses a high-speed, high contrast optical modulator which employs strained multiple quantum well structures spaced from one another such that the stress perpendicular to the direction of the spacing is released, thus leaving only a uniaxial stress along the direction parallel to the spacing. The multiple quantum well structures can then be sandwiched between two optic polarizers. However, while these devices have surpassed conventional QCSE devices in performance and utility, these devices lack multi-mode, room temperature operation due to the need for thermally inducing the strain between the substrate and the epitaxial layers. Thus, these devices not only require the use of a substrate having a preselected strain using exacting crystallographically cut substrates, but they must be kept at a constant temperature (i.e. cooled), and the strain cannot be changed. Therefore, there still remains a need for a high contrast and high speed optic modulator which can be dynamically modulated and operated at room temperature. The present invention fulfills such a need.

SUMMARY OF THE INVENTION

Accordingly, one object of the present invention is to provide a high speed, high contrast optic modulator that can be dynamically modulated.

Another object of the present invention is to provide such a modulator which can be fabricated with standard epitaxy techniques.

Still another object of the present invention is to provide such a modulator which can be operated at room temperature.

These and other objects of the present invention are accomplished by fabricating or mounting a multiple quantum well (MQW), which when strained alters the absorption coefficient of the MQW, on a piezoelectric substrate. The strain to the MQW can be dynamically changed by variably controlling a voltage which is applied to the piezoelectric substrate. With such a device, the induced strain orientation in the substrate can be changed with the application of either a DC or an AC bias. This allows operation at temperatures dictated by consideration other than achieving the static bias levels required in the prior art devices and also provides a device having the flexibility to operate in several modes rather than requiring a discrete device for each desired operating mode.

More particularly, the present invention includes an MQW which is fabricated such that at a particular level of purely mechanical stress/strain the optical properties of the MQW are altered by breaking the heavy and light hole degeneracy (splitting of the heavy and light holes in the valence band) of the MQW in the E-k domain. In a preferred embodiment of the invention, ring electrical contacts are disposed on the MQW and a bottom contact is mounted on a piezoelectric substrate, in the proper crystallographic orientation and strain induced orientation, via an epoxy.

In operation, a bias is applied to the MQW structure and the piezoelectric substrate. The bias causes quantum decoupling of the heavy and light holes; however, the bias also will cause the piezoelectric material to move, which will induce a strain on the MQW structure. This strain will, in turn, also induce a decoupling of the heavy and light holes, but to a greater degree than the decoupling induced by the electrical bias and therefore, the absorption of the MQW will altered, thereby polarizing optical signal incident to (or through) the device.

BRIEF DESCRIPTION OF THE DRAWINGS

These and other objects, features, and details of the invention will become apparent in light of the ensuing detailed disclosure, and particularly in light of the drawings wherein:

FIG. 3 shows a cross section view another alternative embodiment of the invention; and FIG. 4 shows a perspective view of alternative embodiment of the invention in FIG. 3. It is to be noted that the illustrations are not drawn to scale. The dimensions of the various layers of the structures depicted have been enlarged for the purposes of illustration.

DETAILED DESCRIPTION OF THE INVENTION

It is well known that the application of a voltage across faces of a piezoelectric crystal produces a mechanical distortion of the material. When an electric polarization, or electric dipole moment per cubic meter, is induced in a piezoelectric crystal by an externally applied electric field, the crystal undergoes a strain which is proportional to the polarization. Since the polarization is proportional to the electric field, the strain is proportional to the electric field. Piezoelectric strains induced by a static electric field are usually small compared to those that can be obtained by an alternating, dynamic voltage. In this regard, the maximum strain occurs at a frequency which is substantially equal to one of the mechanical resonance frequencies of the crystal. Therefore, as a first step in the practice of the invention, one must calculate the appropriate mechanical resonance frequencies of the crystal to be used to determine the resonance frequency for the optimum strain obtainable from that crystal. One then orients the faces of the substrate material with respect to the crystallographic axes to get the desired motion. To do this, the piezoelectric constants of a selected substrate are accurately measured by a method well known in the art using the piezoelectric equations of motion. Typically these measured constants are represented by a matrix. The piezoelectric constants multiplied by the elastic tensors determine the direction and magnitude of stress. With this information one can calculate the optimum or maximum frequency or voltage for switching, or other operation. It follows that other, variable, strains can be obtained by changing the frequency or voltage from this optimum value. The strain in the substrate is switched by an applied voltage change. In such a dynamic mode, the substrate has no preset stresses and strains, but only those applied by the applied dynamic or static voltage which thereby changes the magnitude and orientation of the strains.

In general, the matrix relationship between induced strain and applied electric field can be shown by the equation:

$$S_j = d_{ij} E_i$$

For purposes of illustrating the present invention, consider the 422 crystal class, which is unique because it provides the simplest matrix relation for achieving an induced strain. For example, by applying 2 volts to a 1 micron sillenite substrate where $d = 40 \cdot 10^{-12}$ coul./newton and $E = 2/10^6$ V/m, the induced strain in the x-direction will be 0.008%.

Figure 1:
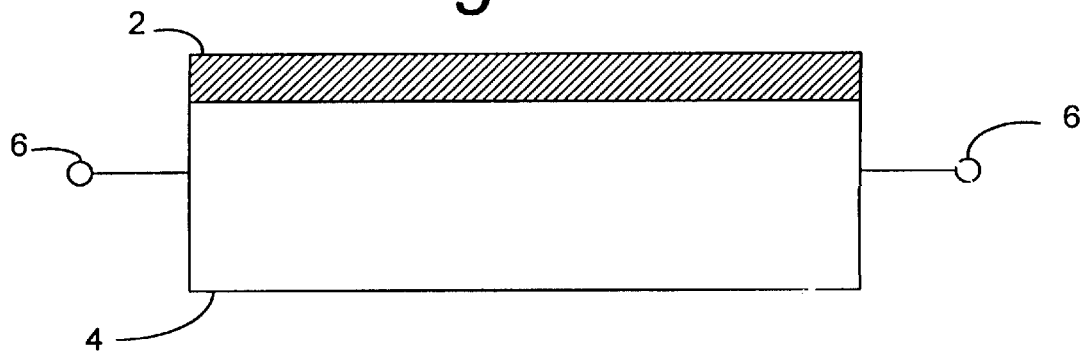
FIG. 1 shows side schematic view of a heterostructure according to the invention wherein a substrate is attached to means for applying an electric field thereto.

Now referring to the Figures, an exemplified embodiment of the present invention is shown in FIG. 1. As shown, a substrate 4 of piezoelectric material is selected from any known piezoelectric material with the properties discussed above. Suitable materials non-exclusively include quartz, lithium niobate, lithium tantalate, langasite, aluminum nitride, zinc oxide and polycrystalline ceramics such as lead zirconate titanate (PZT), or one of the piezoelectric semiconductors such as GaAs, or its alloys. The dimensions of the substrate typically range from about 0.6 cm to about 5 cm in both length and width and from about 0.03 cm to about 0.08 cm in thickness.

Disposed on the surface of substrate 4 is a thin, active MQW 2 having a thickness of from about 500 to about 2,000 angstroms. The MQW may be composed of a composite 2–4 semiconductor such as gallium arsenide (GaAs)/aluminum gallium arsenide (AlGaAs), indium phosphide (InP)/indium gallium arsenide (InGaAs). The semiconductor layering of the wells/barriers may also have a composite, such as $Al_xGa_{1-x}As$, where x is less than 1. These composites and combinations of materials are well known in the art and accordingly, one skilled in the art could engineer any number of types of MQW structures which would operate according to the present invention. However, the MQW structure must exhibit a decoupling of the heavy and light holes in the valence, i.e. a breaking of the heavy and light hole degeneracy in the E-k domain, when an electric field or strain is placed on the MQW.

The MQW may be optionally lithographically imaged and etched to the desired configuration on the piezoelectric substrate or the MQW can be fabricated separately and bonded to the substrate via a conductive epoxy. These epitaxy, vapor deposition, and etching techniques are well known to those skilled in the art.

As shown in FIG. 1, opposite sides of the substrate and the MQW may be coated with a conductive material prior to growing the active material layer. These are usually, but not necessarily, normal to the x, y or z crystallographic axes of the substrate crystal material to produce a desired uniaxial strain.

In operation when a voltage is applied to the piezoelectric substrate, a strain is induced in the substrate as described above, which in turn induces a strain in the MQW epitaxial layer. As explained above, the MQW changes its transparency or polarization in response to this applied strain, due to the decoupling of the heavy and light holes. Because the composition and thickness of heterostructure are predetermined such that when the crystallographic axes of the piezoelectric substrate are strained in a predetermined direction (for example, the stress is perpendicular to the a longitudinal direction of the MQW is applied), a uniaxial or biaxial stress is created parallel to the longitudinal direction of the MQW. As explained in an article entitled, "Biaxial and Uniaxial Stress in Gallium Arsenide on Silicon: A Linear Polarized Photoluminescence Study," *Journal of Applied Physics*, Vol. 68, Pg. 369, July 1990, creating a uniaxial stress along such a direction results in the decoupling of the heavy and light holes in the valence band. This decoupling of the heavy and light holes, due to the uniaxial stress, provides an anisotropy in the absorption of optic signals incident to a MQW at zero electric field. Thus, light passing through the heterostructure at a predetermined electric field will be polarized.

In the preferred embodiment of the present invention, the MQWs are fabricated such that the quantum decoupling of the heavy and light holes (due to the application of an electric field) is smaller than the decoupling resulting from the creation of the uniaxial or biaxial stress along the predetermined direction(s), i.e. the confinement energies in the valence band are smaller than the decoupling resulting from the uniaxial or biaxial stress. With the quantum wells fabricated in this manner, the principle quantum axis of the heterostructure is assured to be aligned in parallel with the crystallographic stress axis of the piezoelectric substrate. It should be noted that the above stated condition may be satisfied by several different types of MQWs and piezoelectric substrates, all of which could be engineered and manufactured by those skilled in the art. Therefore, the present invention is not limited to any particular method of fabrication or any specific heterostructure except that the heterostructure must meet the above stated condition.

Given this configuration then, when the electric field is applied, however, the anisotropic absorption of the heterostructure will rotate the polarization of the light as described above.

In operation, the substrate is in ohmic contact with an a signal generator, via electrodes 6, capable of changing the frequency of the applied voltage. At the natural frequency of the device, the displacement is very large. The field can be applied in many ways such as attaching electrodes from the signal generator to the substrate.

Figure 2:
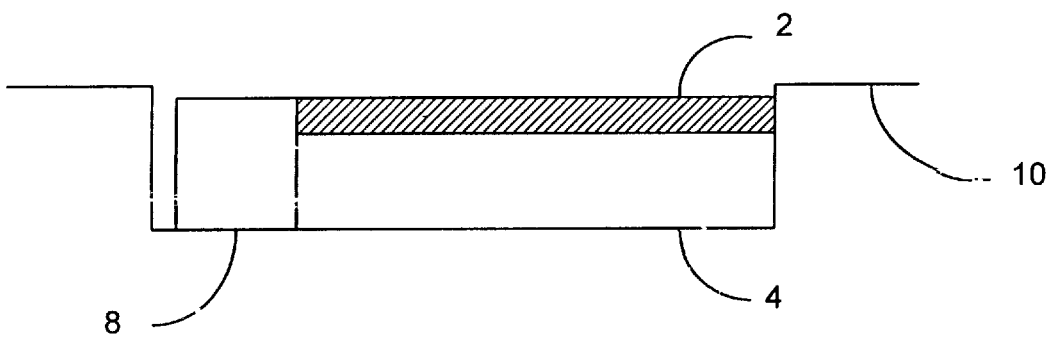
FIG. 2 shows a side schematic view of an alternative embodiment of the invention including a transducer which causes the substrate to vibrate.

FIG. 2 shows an alternative embodiment of the invention, wherein the piezoelectric substrate is caused to vibrate by a suitably vibrating transducer 8 instead of a voltage. Transducer 8 is attached to piezoelectric substrate 4 and, when the transducer vibrates, it causes the piezoelectric substrate to vibrate. At suitable frequency, such as the resonance frequency of the device, an optimum strain in the piezoelectric substrate causes the active MQW 2 to behave as described above. The piezoelectric substrate, transducer and active MQW may be constrained in a suitable frame 10. In use, application of a voltage or vibrations from a transducer causes the piezoelectric substrate to expand and contract along a calculable crystallographic direction and establishes standing waves with a periodic strain pattern at selected frequencies. This produces a highly reliable room-temperature, or other temperature, modulation mechanism. The mechanism can be quasi-static by application of DC voltages in non-resonant modes, or dynamic by application of AC voltages at or near the resonance frequency of the device.

In order to produce a spatial light modulator, the device may be sandwiched between two optic polarizers which are aligned with the heterostructure such that their axes vary, for example 45° and −45° off the direction of the stress such as is shown in U.S. Pat. No. 5,274,247. The creation of the stress results in an anisotropic absorption of light. This anisotropic absorption across the heterostructure rotates the polarization of light incident to the heterostructure. Therefore, when light passes through a first polarizer, the polarized light then passing through the heterostructure is further polarized such that the polarization of the light is rotated to pass through a second polarizer. However, when an electric field is applied to the heterostructure, no polarization of the light takes place and therefore the optic signal cannot pass through the second polarizer. Thus, optic signals may be modulated with the contrast of polarizer devices at the speed of superlattice heterostructures. In use, at zero applied electric field, the heterostructure polarizes light applied therethrough. With an electric field applied at a resonance frequency, the heterostructure is transparent.

Now referring to FIGS. 3 and 4, there is shown a cross-section and a perspective view, respectively, of another alternate embodiment of the present invention. As shown, a top ring contact 100 is fabricated on a top surface of the MQW structure 120, which is of a circular design. A bottom ring contact 130 is fabricated to contact a bottom side of the MQW structure 120 and the whole structure is epoxied (via epoxy 140) to two independent piezoelectric substrates 150 and 160. Electrical leads 170 and 180 are electrically coupled to the top and bottom ring contacts 100 and 130, respectively, so as to bias the entire device by voltage V.

In operation, linearly polarized light is directed to the top surface of the MQW and when appropriately biased, as explained above, the polarized light is polarized further due to the change in absorption of the MQW. This polarized light is either linearly polarized though the MQW or it is elliptically polarized depending on the MQW and the bias applied to induce the strain.

As light is passed through the structure, several parameters are affected leading to the required modulation of light. These parameters are defined below.

Intensity Output:

$$I(V) = I_o(V)\{\sin^2[\theta(v) - \theta_{off}\theta] + \cos[2\theta(V)]\cos\{2\theta_{off}\}\sin^2[\Delta\Phi(v)/2]\}$$

Intensity at SLM:

$$I_o(v) = I_{Inc} e^{-\alpha(v)d} (d = d_{QW} \cdot \text{number}_{QW})$$

Isotropic Absorption Coefficient:

A theoretical or empirical method may be employed as follows:

$$\text{Calculate } \alpha(v) = Im\{A_j(E - E_j + i\Gamma_j)^{-1} + B_j In[\Gamma_j + i(E - E_j - E_j^{ex})]\}$$

where $\{j = 1(hh), 2(lh)\}$ or

Empirically: $E = V/(d_{Qw} + d_B) \cdot \eta_{Qw}$

Polarization Angle of Rotation:

$$\theta(V) = \arctan[\exp(\Delta\alpha d/2)] - 45°$$

Anisotropic Absorption Coefficient:

$$\Delta\alpha(V) = \alpha(v)[\pm 2(3)^{1/2} \sin(2\Phi)/2 \pm \cos(2\Phi))]$$

Phase Retardation Angle:

$$\Phi = \text{Arctan}[(3)^{1/2}\theta/(1 + 3\theta^2)^{1/2}]$$

where:

$$\eta = \frac{\Delta E_s}{\Delta E_{QW} + (1 - 2\gamma)\Delta E_s}$$

and $$\Delta E_s = b(\epsilon_{xx} - \epsilon_{yy}); \Delta E_s = b(\epsilon_{xx} + \epsilon_{yy});$$

$$\gamma = S_{12}/S_{12} + S_{11};$$

$$\epsilon_{xx}(T) = {}_{TO}\int^T [a_x(T) - a_{MQW}(T)]dT; \text{ and}$$

$$\epsilon_{yy}(T) = {}_{TO}\int^T [a_y(T) - a_{MQW}(T)]dT$$

Relative Phase Retardation Angle:

$$\Delta\Phi = 2\pi\Delta n/\lambda$$

[$\Delta n$ (birefringence) = $n_x - n_y$ is measured empirically]

SLM Performance Characteristics:
Contrast Ratio:

$$C.R.=I(V^{on})/I(V^{off})$$

Power Dissipation:
Electrical Power Provided P=Watts/Area(S)
Optical Power at SLM $I_{inc}$ $(1-e^{-\alpha(v)d})$
Optical Power Absorbed at $2^{nd}$ Polarizer:

$$II_{Inc}e^{-\alpha(v)d}-I(V)I$$

Modulation Depth:
10Log($P_{Trans}${ON})–10Log($P_{Trans}$({OFF})
In order to provide an example of the performance of the discussed device the following is a list of assumptions for these parameters and the associated yields of the device based on the following assumptions.
Assumptions:

| | |
|---|---|
| V = 14 volts | I = 1 μA |
| W = 14 μW | S = 9 × 10⁻⁴ cm² |
| $d_{QW}$ = 80 Å | $d_s$ = 60 Å |
| $n_{QW}$ = 150 | $\Gamma_j$ = 4 meV(@R.T.) |
| $\theta_{off}$ = 0° | b = 2eV |
| $a_x$ = 16.2 × 10⁻⁶/°C. | $a_y$ = $a_{QW}$ = 6.2 × 10⁻⁶/°C. |
| $\epsilon_{yy}$ = 0 | $T_o$ = 150° C. |
| $\epsilon_{zz}$ = γ($\epsilon_{xx}$ + $\epsilon_{yy}$) ≈ γ$\epsilon_{xx}$ | $V_{on}$ = 0 Volts |

$V_{off}$=14 volts
$I_{inc}$=1 (Normalized)
Ideal QW(i.e. No Fluctuations)
λ=845 nm With these assumptions for the device shown in FIGS. 3 and 4, the Empirical calculation for the isotropic absorption coefficient, as calculated from the standard quantum well Hamiltonian is: $E_{jex}$=1.424+0.059=1.483 eV and $E_j$=8 meV (hh) and 7 meV(lh). Using the Luttinger-Kohn Hamiltonian, the calculation in the change of the isotropic absorption coefficient, $\Delta E_{QW}$, is 10 meV.

Further, given the following design issues:

$$I(V)=5 \times 10^4(a.u.@V_{on}) \text{ and } 10(a.u.@V_{off});$$

$$I_o(V)=5 \times 10^4(a.u.@V_{on}) \text{ and } 4 \times 10^3(a.u.@V_{off});$$

α(V)=20,000 cm⁻¹; θ(V)=15°;Δα(hh)=7700 cm⁻¹($V_{on}$) and 5400 cm⁻¹ ($V_{off}$); Φ=37°, where γ=0.12%; and ΔΦ=30°, one finds that the device has a contrast ratio of 5000:1 at R.T.; electric power provided is 15.5 mW/cm² and an optical power at the SLM is 1 W/cm²; the optical power absorbed at the second polarizer (if a second polarizer is used) is 0.11 W/cm²; and the modulation depth is 37 dB.

Accordingly, as is shown by this data, the devices of the present invention allow extremely rapid operation at room temperature, DC operation due to large strains, fast compression and/or tensile stress depending on voltage polarity, and have an increased signal-to-noise ratio compared to other devices. The devices can be voltage-controlled or frequency-controlled and the frequency can be RF modulated.

It is to be understood that other features and modifications to the foregoing detailed description are within the contemplation of the invention which is not limited thereby. As will be further appreciated by those skilled in the art, the amount of contrast of which the present device is capable is dependent upon the quality of polarizers used. Therefore, virtually any type of polarizer as well as any manner of polarizer orientation may be employed in the present invention.

Similarly, the intensity and rate of modulation of the present invention will depend upon the manner in which the heterostructure is designed. Therefore, it is anticipated that many different types of structures may be used in various applications of the present invention. For example, although the above teaching addresses the case of a spatial light modulator (SLM), comprising a single pixel, it is apparent that the present invention can be configured in a matrix arrangement to modulate many pixels in one-, two-, or three-dimensions, singly, or in combination, by one or several modulation sources.

What is claimed is:

1. An optic modulator for dynamic modulation of optical, signals comprising:
    a transparent piezoelectric substrate;
    an active semiconductor heterostrticture disposed on the piezoelectric substrate, wherein the active semiconductor heterostructure has a composition, structure, and energy band alignment such when an anisotropic strain is applied to the active semiconductor heterostructure, the heavy and light holes of valence bands of the semiconductor heterostructure decouple; and
    means for causing the piezoelectric substrate to vibrate and thereby to cause an anisotropic strain in the semiconductor heterostructure responsive to vibrations applied thereto and wherein the anisotropic strain causes the heavy and light holes of the valence bands of the semiconductor heterostructure to decouple thereby altering the optical absorption of the semiconductor heterostructure in response to such vibrations.

2. The optic modulator of claim 1, wherein said piezoelectric substrate is crystallographically aligned with a predetermined axis of strain to be placed on the semiconductor heterostructure.

3. The optic modulator of claim 2, wherein the means for causing said piezoelectric substrate to vibrate is an electrical bias.

4. The optic modulator of claim 2, wherein the means for causing said piezoelectric substrate to vibrate is a transducer.

5. The optic modulator of claim 2, wherein said semiconductor heterostructure is bonded to a surface of said piezoelectric substrate via an epoxy.

6. The optic modulator of claim 2, wherein said piezoelectric substrate comprises a material selected from the group consisting of quartz, lithium niobate, lithium tantalate, langasite, aluminum nitride, zinc oxide, polycrystalline ceramics, and piezoelectric semiconductors.

7. The optic modulator of claim 2, wherein said means for causing the piezoelectric substrate to vibrate causes vibrations which are at about the resonance frequency of the semiconductor heterostructure.

8. The optic modulator of claim 2, wherein said means for causing the piezoelectric substrate to vibrate comprises means for applying a variable electric field to the piezoelectric substrate.

9. The optic modulator of claim 2, further comprising first and second electrical contacts electrically coupled to said semiconductor heterostructure, wherein said first and second electrical contacts apply a bias across the semiconductor heterostructure and provide the means for causing the piezoelectric substrate to vibrate.

10. The optic modulator of claim 9, wherein the first and second electrical contacts are disposed on a top and a bottom surfaces, respectively, of said semiconductor heterostructure and are ring shaped so as to permit incident light to pass through the semiconductor heterostructure.

11. The optic modulator of claim 10, wherein the second electrical contact is bonded to the piezoelectric substrate via epoxy.

12. An optic modulator for dynamic modulation of optical signals comprising:

a transparent piezoelectric substrate;

an active semiconductor heterostructure disposed on the piezoelectric substrate, wherein the active semiconductor heterostructure has a composition, structure, and energy band alignment such when an anisotropic strain is applied to the active semiconductor heterostructure, the heavy and light holes of valence bands of the semiconductor heterostructure decouple; and means for causing the piezoelectric substrate to vibrate and thereby to cause an anisotropic strain in the semiconductor heterostructure responsive to vibrations applied thereto and wherein the anisotropic strain causes the heavy and light holes of the valence bands of the semiconductor heterostructure to decouple thereby altering the optical absorption of the semiconductor heterostructure in response to such vibrations;

first and second polarizing means disposed on alternate sides of said semiconductor heterostructure; and means to apply an optical signal to at least one of the polarizing means.

13. The optic modulator of claim 12, wherein said piezoelectric substrate is crystallographically aligned with a predetermined axis of strain to be placed on the semiconductor heterostructure.

14. The optic modulator of claim 13, wherein the means for causing said piezoelectric substrate to vibrate is an electrical bias.

15. The optic modulator of claim 13, wherein the means for causing said piezoelectric substrate to vibrate is a transducer.

16. The optic modulator of claim 13, wherein said semiconductor heterostructure is bonded to a surface of said piezoelectric substrate via an epoxy.

17. The optic modulator of claim 13, wherein said piezoelectric substrate comprises a material selected from the group consisting of quartz, lithium niobate, lithium tantalate, langasite, aluminum nitride, zinc oxide, polycrystalline ceramics, and piezoelectric semiconductors.

18. The optic modulator of claim 13, wherein said means for causing the piezoelectric substrate to vibrate causes vibrations which are at about the resonance frequency of the semiconductor heterostructure.

19. The optic modulator of claim 13, wherein said means for causing the piezoelectric substrate to vibrate comprises means for applying a variable electric field to the piezoelectric substrate.

20. The optic modulator of claim 13, further comprising first and second electrical contacts electrically coupled to said semiconductor heterostructure, wherein said first and second electrical contacts apply a bias across the semiconductor heterostructure and provide the means for causing the piezoelectric substrate to vibrate.

21. The optic modulator of claim 12, wherein the first and second electrical contacts are disposed on a top and a bottom surfaces, respectively, of said semiconductor heterostructure and are ring shaped so as to permit incident light to pass through the semiconductor heterostructure.

22. The optic modulator of claim 21, wherein the second electrical contact is bonded to the piezoelectric substrate via epoxy.

* * * * *